Sept. 2, 1952  J. F. KING, JR  2,609,064
APPARATUS FOR CLEANING FILTER SCREENS
Filed Jan. 15, 1951  3 Sheets-Sheet 1
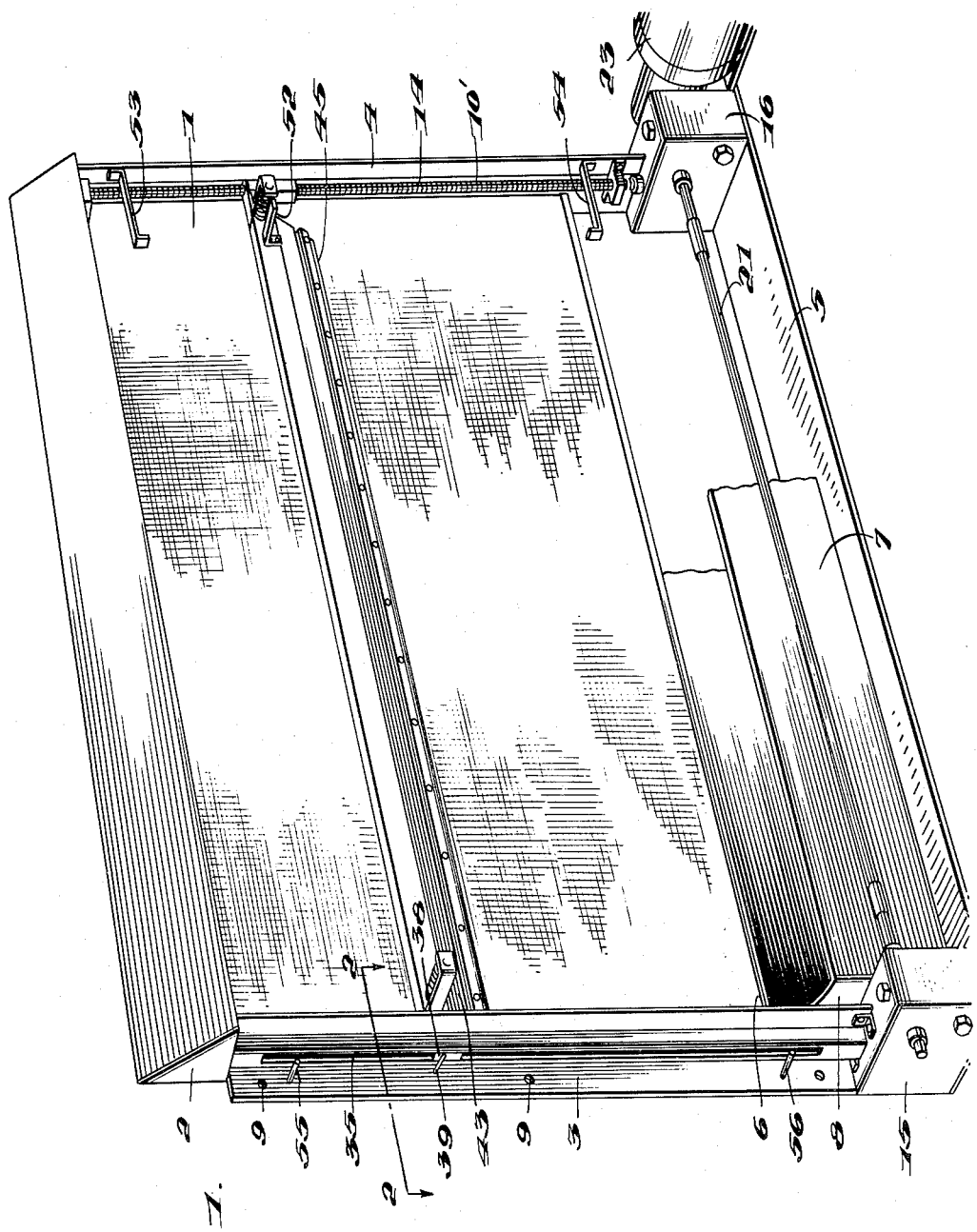
INVENTOR
James Frank King, Jr
BY Pierce, Scheffler & Parker
ATTORNEYS

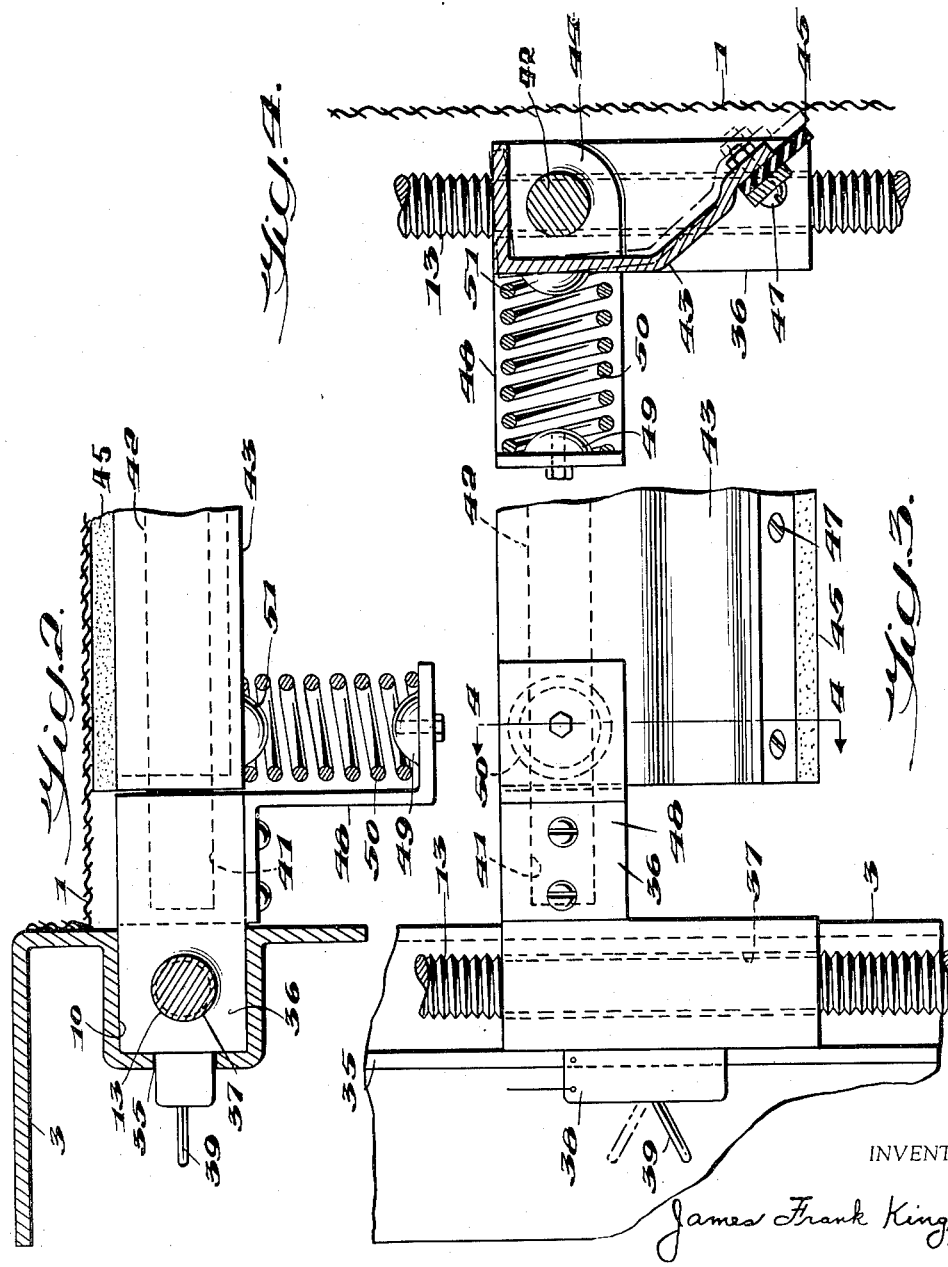

Sept. 2, 1952 J. F. KING, JR 2,609,064
APPARATUS FOR CLEANING FILTER SCREENS
Filed Jan. 15, 1951 3 Sheets—Sheet 3
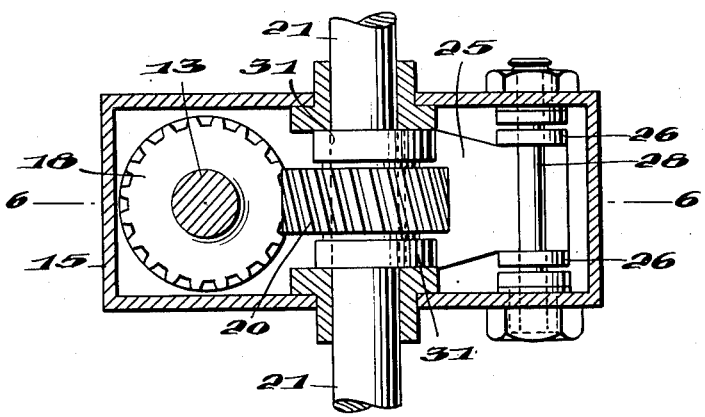
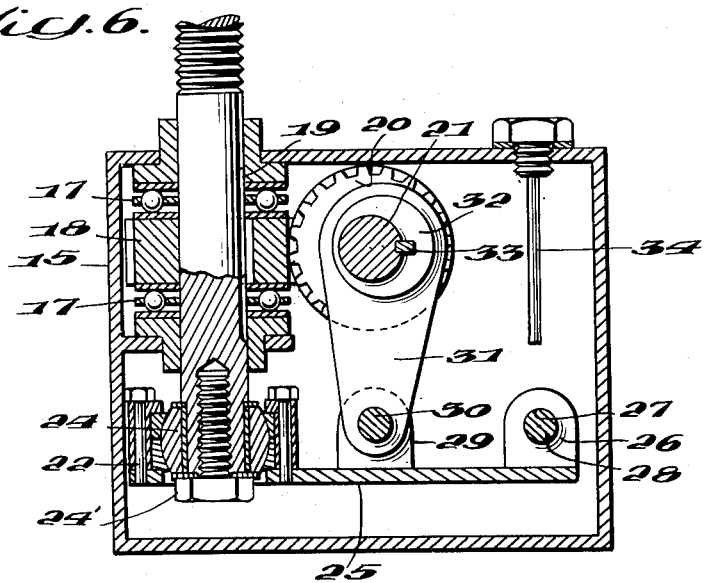
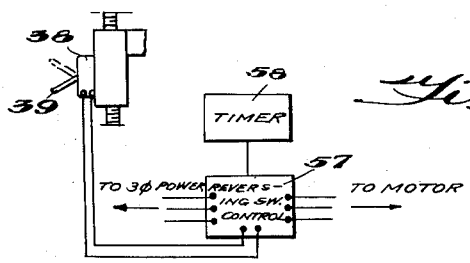
INVENTOR
James Frank King, Jr
BY Pierce, Scheffler & Parker
ATTORNEYS Patented Sept. 2, 1952

2,609,064

UNITED STATES PATENT OFFICE 2,609,064

APPARATUS FOR CLEANING FILTER SCREENS

James F. King, Jr., Winston-Salem, N. C., assignor to The Bahnson Company, Winston-Salem, N. C., a corporation of North Carolina Application January 15, 1951, Serial No. 206,006

8 Claims. (Cl. 183—60)

The present invention relates to apparatus for cleaning filter screens and more particularly to those screens of the flat reticulated type which are used in air circulating systems for weave rooms and the like to remove lint and other matter which may be entrained in the recirculated air.

An object of the invention is to provide a cleaning device for flat filter screens in which a wiper blade is advanced from one edge of the screen to the other, the blade including a reciprocating motion along the axis of its advance across the screen which enables the blade to recapture any lint or other matter that may happen to pass under the blade during any of its forward increments of movement across the screen.

Another object is to provide for operating the filter cleaner periodically in a cyclic manner that is timed to hold the pressure drop of the air being drawn in through the screen to a satisfactory minimum level.

The foregoing as well as other objects and advantages inherent in the improved screen cleaner will become more apparent from the following detailed description of a preferred construction together with the accompanying drawings in which:

Fig. 1 is a view in perspective of the complete screen and cleaning mechanism as seen from the front or air inlet side;

Fig. 2 is a fragmentary horizontal section taken on line 2—2 of Fig. 1;

Fig. 3 is a fragmentary elevation at one side of the filter screen;

Fig. 4 is a vertical section taken on line 4—4 of Fig. 3;

Fig. 5 is a horizontal section taken through one of the gear boxes;

Fig. 6 is a vertical section on line 6—6 of Fig. 5 and;

Fig. 7 is a schematic wiring diagram for controlling the motor used to advance the wiper blade across the filter screen.

With reference now to the drawings, the filter screen shown at 1 is fixed along all sides thereof to the back of a rectangular frame comprised of a top cover plate 2, basically L-shaped side plates 3, 4 and a bottom L plate 5, one side of the latter also forming the rear wall of a receptacle 6 into which the lint and other matter stuck against the screen is deposited. The front wall of this receptacle is shown at 7 and the end walls at 8. Bolt holes 9 in the side plates 3, 4 are provided for the purpose of fastening the screen frame in place across the duct (not shown) through which the air is passed.

As shown in Fig. 2, each of the side plates 3, 4 is provided with a longitudinally extending groove 10 of rectangular cross section for housing screw spindles 13, 14. The upper ends of the latter are journalled in bearings (not shown) at the upper ends of the side plates and the lower ends of the spindles terminate within gear boxes 15, 16. These gear boxes, box 15 being shown clearly in Figs. 5, 6, include anti-friction thrust bearings 17 for the lower end portion of the spindle 13, a driven gear 18 mounted on spindle 13 by an elongated spline connection 19 which permits a limited displacement of the spindle along its axis relative to gear 18 while being driven in rotation, and a driving gear 20 mounted upon a drive shaft 21 that extends horizontally through both boxes and is coupled to the drive shaft of an electric motor 23.

The mechanism for imparting a reciprocating motion to the spindles 13, 14 and hence to the wiper blade assembly to be later described is included within the gear boxes and comprises an arm 25 having upstanding ears 26 at one end apertured at 27 to receive a horizontal pivot pin 28 that is anchored at its opposite ends in the side walls of the gear box 15. The other end of arm 25 terminates in a socket 22 which receives a ball member 24 secured by bolt 24' to the lower end of spindle 13. Intermediate the ends of the arm 25 are a second pair of upstanding ears 29 apertured to receive a pin 30. A pair of crank rods 31 are connected at their lower ends to pin 30, and the upper ends of the crank arms are connected to eccentrics 32 keyed at 33 upon the drive shaft 21. Thus as the drive shaft 21 is rotated, spindle 13 will be rotated through gears 20, 18 and the spindle will simultaneously reciprocate along its axis due to the rotation of eccentrics 32 and crank motion of rods 31 by which the arm 25 is rocked up and down about pivot pin 28.

The gear box 15 is adapted to be nearly filled with lubricating oil and may include the oil stick 34 for measuring the oil level.

Gear box 16 associated with the other spindle 14 is identical with gear box 15 and hence no detailed description of it is considered necessary.

With reference now in particular to Figs. 2–4, an L-shaped block 36 provided with a threaded bore 37 for threaded engagement with spindle 13 establishes a sliding fit within the recess 10 in side plate 3. This prevents any rotation of the block relative to the spindle and hence as the spindle rotates, block 36 will be run up or down the spindle, dependent of course upon the direction in which the spindle rotates.

Plate 3 also includes a longitudinally extending slot 35 wide enough to accommodate the body of an electrical switch 38 of conventional construction having a pivotally mounted actuating lever 39, the switch body being secured to block 36 in any suitable manner.

The inner end of block 36 is provided with a cylindrical bore 41 adapted to receive one end of a cylindrical shaft 42. The latter extends across the screen to the other plate 4 and terminates within the bore of another block of like construction as the block 36 and which is adapted to run up and down the other screw spindle 14 in the groove 10' in side plate 4.

Mounted on shaft 42 is a support plate 43 for the wiper blade. The plate 43 includes an inturned apertured flange 44 at each end thereof through which the shaft 42 passes, thus rendering the plate 43 rotatable about the axis of this shaft, and the wiper blade 45 which may be made from a strip of rubber is fastened across the bottom edge of plate 43 by a plurality of spaced bolts 47.

According to the present invention the wiper blade is adapted to engage the surface of screen 1 during advance of the blade from the top to the bottom of the screen. On the return movement of the blade to the starting position, the blade preferably does not contact the screen surface. To this end, a toggle mechanism is provided at each end of the blade support 43 to rock the latter and hence the blade 45 in the direction of screen 1 each time the support 43 reaches its uppermost position relative to the screen, and similarly to rock the support away from the screen when support 43 reaches its lowermost position.

Each toggle mechanism includes a bracket 48 fixed to block 36 and which includes a rounded boss 49 constituting a pressure point for one end of the toggle compression spring 50. The other end of spring 50 bears against a rounded boss 51 on support plate 43. To actuate the toggle mechanism, plate 43 carries a trip arm 52 at the side near spindle 14 which cooperates with upper and lower stationary trip arms 53, 54 which project from the side plate 4 into the path of trip arm 52. Thus as plate 43 reaches its lowermost position, trip arm 54 rocks arm 52 and hence the plate 43 and blade 45 clockwise to the position shown in full lines as viewed in Fig. 4. Conversely when plate 43 reaches its uppermost position, trip arm 53 will rock arm 52 and hence the plate and blade 45 counterclockwise to the position shown in broken lines where the blade 43 bears against the surface of screen 1. The screen is stretched taut in the frame and hence will give but very little as the blade 43 descends across its surface thus assuring adequate blade pressure on the screen to effect satisfactory removal of all foreign matter lodged on the screen.

It has already been explained that rotation of the screw spindles 13, 14 is reversed in order to reverse movement of the wiper blade 45 and the parts associated therewith. The preferred type of control is by use of the switch 38 in conjunction with a pair of trip arms 55, 56. As the block 36 reaches its uppermost position, switch lever 39 will be tripped by the upper arm 55 to the down position shown in full lines in Fig. 3 thus actuating the switch contacts and effecting reversal of the 3φ motor 23 through relay apparatus 57 of conventional arrangement and hence illustrated only in block schematic in the wiring diagram of Fig. 7. Reversal of motor 23 reverses the direction of shaft 21, gears 20, 18 and hence the spindles 13, 14 causing the blade support 43 to reverse its direction of movement and start downward.

In a similar manner, when blade support 43 nears the bottom of screen 1, the switch lever 39 will be tripped to its other position shown in broken lines in Fig. 3 by the lower trip arm 56 thus reversing motor 23. This reverses the direction of rotation of spindles 13, 14 and hence also the direction of motion of blade support 43 which now will be upward. As previously explained, blade 45 will be in scraping engagement with the screen 1 during its downward advance across the screen face but out of contact therewith during the return upward trip.

During the downward course of blade 45 a reciprocating movement of the blade in the direction of the spindle axis will also take place due to the action of the eccentric mechanism previously explained. Thus any lint or other matter which should happen to pass under the blade during a forward movement of the latter rather than be pushed ahead of the blade will be uncovered during the backward movement of the blade thereby giving the blade another opportunity to push it towards the bottom of the screen. When the blade 45 reaches the bottom of screen 1, the lint, etc. is forced off and drops into receptacle 6.

As shown in Fig. 7, a timer device 58 of conventional construction may be incorporated in the control so that the screen cleaning device will be operated at prescribed intervals calculated to prevent too much of a pressure drop from being built up at the screen between successive cleaning periods. The device has been found satisfactory to effect removal of substantially all foreign matter from the air intake side of the filter screen in one pass of the blade across the face of the screen and hence the timer can be set to allow motor 23 to run just long enough during each period of operation to effect one complete cycle of blade movement, i. e. from a starting position at the top of the screen to the bottom followed by a return movement to the starting position. Or if desired, the timer can of course be set to provide two or more complete operating cycles of the blade 45. If manual control only is necessary, the timer can be replaced by a manually controlled switch placed between the power source for the motor and the relay apparatus 57.

In conclusion, I wish it to be understood that while the embodiment of my invention above described and illustrated is preferred, various minor changes in the construction and arrangement of component parts may be made by others without however departing from the spirit and scope of the invention as defined in the appended claims.

I claim:

1. Apparatus for cleaning a screen type filter comprising a wiper substantially in surface contact with a face of said filter screen, means moving said wiper to advance the same along a given axis across the face of said screen, and means compounding said advance movement of said wiper in a given direction along said axis with a simultaneous reciprocatory motion along said axis.

2. Apparatus for cleaning a screen type filter comprising a wiper substantially in surface contact with a face of said filter screen, means moving said wiper along an axis transversely of the longitudinal axis thereof to advance the same across the face of said screen, and means compounding said advance movement of said wiper in a given direction along its axis of advance with a simultaneous reciprocatory motion along such axis.

3. Apparatus for cleaning a screen type filter as defined in claim 2 wherein the means for advancing said wiper across the screen face is comprised of a wiper support threadedly engaged with a screw rotatable about its axis thereby to advance said support and wiper along the screw axis, and means effecting a reciprocating movement of said screw along its axis.

4. Apparatus for cleaning a screen type filter comprising a wiper substantially in surface contact with a face of said filter screen, a support for said wiper, a screw mounted for rotation about its longitudinal axis and threadedly engaged with said support thereby to effect an advance of the wiper across the screen face upon rotation of the screw, means mounting one end of said screw for limited motion along its axis, means imparting a rotary motion to said screw, and means imparting a reciprocating axial motion to said screw through the said mounting means therefor.

5. Apparatus for cleaning a screen type filter as defined in claim 4 wherein the said mounting means for said screw end is comprised of a pivotally mounted arm one end of which is connected with said screw end and the other to a stationary pivotal support, the said means for imparting rotary motion to said screw comprises a driven gear keyed upon said screw by a spline connection but restrained against axial motion, said spline connection permitting axial displacement of said screw relative to said gear, a driving gear meshed with said driven gear, and the said means imparting axial reciprocatory motion to said screw comprises means oscillating said arm about its pivotal support.

6. Apparatus for cleaning a screen type filter as defined in claim 5 wherein the means for oscillating the said arm supporting the screw end is comprised of an eccentric rotatable with said driving gear and linked to said arm intermediate the ends thereof.

7. Apparatus for cleaning a screen type filter comprising a screw at each side of said screen, means mounting said screws for rotation on their longitudinal axes, a wiper substantially in surface contact with the face of said screen to be cleaned, a support at each end of said wiper threadedly engaged with the screw at the associated side of the screen thereby to effect an advance of said wiper across the screen face upon rotation of the screws, a pivotally mounted support for one end of each screw permitting limited motion of the screw along its axis, a drive shaft extending between the said pivotally mounted ends of said screws, a driving gear secured upon each end of said shaft, a driven gear meshed with each of said driving gears, said driven gears being keyed respectively upon said screws by a spline connection but restrained against axial motion, said spline connection permitting axial displacement of said shafts, an eccentric mounted upon said drive shaft at each end thereof and linked to said pivotally mounted arm intermediate the ends thereof for imparting an oscillating motion to said arm thereby effecting reciprocatory motion of said screws, a motor coupled to said drive shaft, reversing means for said motor, and means disposed at the opposite ends of one of said screws cooperative with means movable with said wiper for actuating said motor reversing means thereby to reverse the direction of rotation of said screws and hence the direction of travel of said wiper.

8. Apparatus for cleaning a screen type filter as defined in claim 7 wherein said wiper is mounted for pivotal movement about its longitudinal axis and which further includes a trip member at the bottom of said screen rotating said wiper away from said screen and a second trip member at the top of said screen moving said wiper back towards said screen.

JAMES F. KING, Jr.

REFERENCES CITED

The following references are of record in the file of this patent:

UNITED STATES PATENTS

| Number | Name | Date |
|---|---|---|
| 407,948 | Case | July 30, 1889 |
| 1,582,499 | Zopf | Apr. 27, 1926 |
| 1,713,880 | McLean | May 21, 1929 |
| 2,537,878 | Coon | Jan. 9, 1949 |